United States Patent [19]
Mino et al.

[11] Patent Number: 5,596,259
[45] Date of Patent: Jan. 21, 1997

[54] METHOD OF CHARGING A SECONDARY BATTERY

[75] Inventors: Takayuki Mino; Toshiharu Kokuga, both of Hyogo, Japan

[73] Assignee: Sanyo Electric Co., Ltd., Osaka, Japan

[21] Appl. No.: 396,308

[22] Filed: Feb. 28, 1995

[30] Foreign Application Priority Data

Feb. 28, 1994 [JP] Japan ................................ 6-029999

[51] Int. Cl.$^6$ ............................................. H01M 10/44
[52] U.S. Cl. ................................. 320/21; 320/27; 320/39
[58] Field of Search ........................... 320/21, 22, 27, 320/39, 48

[56] References Cited

U.S. PATENT DOCUMENTS

| | | | |
|---|---|---|---|
| 4,876,513 | 10/1989 | Brilmyer et al. | 320/48 |
| 5,028,860 | 7/1991 | Amano | 320/23 |
| 5,119,011 | 6/1992 | Lambert | 320/43 |
| 5,148,096 | 9/1992 | Denzinger | 320/32 |
| 5,179,335 | 1/1993 | Nor | 320/21 |
| 5,352,968 | 10/1994 | Reni et al. | 320/35 |
| 5,408,170 | 4/1995 | Umetsu et al. | 320/39 |

*Primary Examiner*—Peter S. Wong
*Assistant Examiner*—Patrick B. Law
*Attorney, Agent, or Firm*—Loeb & Loeb LLP

[57] ABSTRACT

A charging apparatus charges a secondary battery, while controlling an output voltage of the charging apparatus to maintain the effective charging voltage at a substantially constant predetermined value at which the secondary battery is actually charged. Such a method prevents the secondary battery from being overcharged with a overvoltage, and enables the charging time to be short.

13 Claims, 6 Drawing Sheets

| I[A] | Vout[V] | Vdrop[V] | Voff[V] |
|---|---|---|---|
| I ≥ 3.0 | 4.25 | V ≥ 0.15 | V ≤ 4.10 |
| 3.0 > I ≥ 2.0 | 4.20 | 0.15 > V ≥ 0.10 | 4.05 < V ≤ 4.10 |
| 2.0 > I ≥ 1.0 | 4.15 | 0.10 > V ≥ 0.05 | 4.05 < V ≤ 4.10 |
| 1.0 > I ≥ 0 | 4.10 | 0.05 > V ≥ 0 | 4.05 < V ≤ 4.10 |

FIG. 4

METHOD OF CHARGING A SECONDARY BATTERY

FIELD OF THE INVENTION

The present invention relates generally to secondary batteries, more particularly, to method and apparatus for charging a secondary battery.

BACKGROUND OF THE INVENTION

A secondary battery is a battery that can be repetitively recharged. The charging characteristics of a secondary battery including the behavior of the battery terminal voltage as charging progresses often depends upon the type of the secondary battery. For example, a nickel-cadmium battery has a charging characteristics in which the terminal voltage of the secondary battery typically peaks when the battery is fully charged. On the other hand, nonaqueous secondary batteries, such as, for example, a nonaqueous, organic electrolyte, lithium secondary battery (hereinafter referred to as a lithium ion secondary battery), usually does not exhibit a peak of the terminal voltage. Instead, the terminal voltage usually continues to increase as the battery is overcharged. The latter charging characteristics of nonaqueous secondary batteries can make detection of the fully charged state more difficult.

In addition, when secondary batteries of any type are overcharged, the properties of the secondary batteries are usually deteriorated. For example, the life span of the secondary battery is typically decreased by an overcharge. A lithium ion secondary battery is particularly susceptible to weakening as a result of excessive charging.

To prevent the lithium ion secondary battery from being overcharged to an excessively high voltage, U.S. Pat. No. 5,028,860 describes a method of charging using a constant voltage. When the lithium ion secondary battery is charged with a constant voltage, the charging current typically decreases, as the charging progresses to the full charge level. Accordingly, the charging current may be monitored, and when the charging current becomes smaller than a predetermined current value, the charging current can be shut off.

Charging with a constant voltage usually prevents the secondary battery from being overcharged. This is a result of the fact that the terminal voltage of the secondary battery typically does not exceed the applied constant voltage of the charger. However, even though the charging apparatus outputs a constant output voltage, the effective voltage ($V_{off}$) at which the secondary battery is actually being charged is different from the constant output voltage ($V_{out}$) which the charging apparatus applies across the battery. For example, FIG. 1 shows an equivalent circuit of a typical secondary battery which is set between output terminals A, B of a charging apparatus. The battery usually has a series loss resistance (R) which comprises the internal resistance of the secondary battery and the contact resistances between the output terminals A, B and terminals of the secondary battery. Furthermore, when lead wires are connected between the output terminals A, B and the terminals of the secondary battery, the loss resistance can also be increased by the lead wire resistances. Moreover, the loss resistance of the battery typically is not fixed. For example, the internal resistance of the battery can increase as the secondary battery ages, or as the ambient temperature falls. In addition, the contact resistances can increase as a result of poor contacting conditions.

During charging, as long as the charging current (I) flows, a voltage drop ($V_{drop}$=R×I) is caused by the loss resistance (R). Therefore, even though the charging apparatus outputs a constant output voltage ($V_{out}$), the secondary battery is actually charged with an effective voltage ($V_{off}$=$V_{out}$−$V_{drop}$) different from the applied voltage $V_{out}$. Because both the loss resistance R and the charging current can vary as set forth above, this effective voltage is not constant.

For example, when the charging apparatus outputs a constant output voltage ($V_{out}$=4.10 V) and the voltage drop ($V_{drop}$) caused by the loss resistance (R) is 0.10 V, the secondary battery is actually being charged with an effective real voltage ($V_{off}$=4.00 V) which is less than the applied voltage ($V_{out}$). One consequence of the effective voltage ($V_{off}$) being smaller than the applied constant voltage is that it can take longer to fully charge the secondary battery. On the other hand, if the constant output voltage ($V_{out}$) is set to a higher value of 4.20 V, for example, to compensate for the loss resistance to shorten the charging time, the battery can become overcharged. More specifically, as the battery becomes fully charged, the charging current approaches zero and therefore the voltage drop ($V_{drop}$) also approaches zero. Consequently, the effective charging voltage ($V_{off}$) approaches the applied charging voltage ($V_{out}$) and the secondary battery is actually overcharged with an overvoltage of the applied constant output voltage ($V_{out}$=4.20 V). Overcharging is especially troublesome for lithium ion secondary batteries which can become weakened as a result of the overvoltage.

It is seen from the above that it is difficult to select a suitable constant voltage value for the output charging voltage ($V_{out}$). For example, if the constant voltage value of the output voltage ($V_{out}$) is set to a high value, the secondary battery may be overcharged with an overvoltage at the fully charged state. On the other hand, if the constant voltage value of the output charging voltage ($V_{out}$) is set to a low value, the secondary battery may not become fully charged or it may take too long to fully charge the secondary battery.

In general, a charging method which uses a constant voltage takes longer than a charging method which uses a constant current. Therefore, in a constant voltage charging method, it is important to make the charging time short as short as possible.

THE SUMMARY OF THE INVENTION

It is an object of the present invention to provide a method of charging a secondary battery in which the secondary battery is effectively charged with a substantially constant predetermined voltage in a relatively short charging time without being overcharged.

These and other objects are achieved by a method of charging, in accordance with one embodiment of the present invention, in which the effective charging voltage $V_{off}$ is monitored; and the applied output charging voltage ($V_{out}$) is controlled to maintain the effective charging voltage ($V_{off}$) at a substantially constant predetermined value ($V_{offval}$) according to the following expression $$V_{offval} = V_{out} - R_{val} \times I_{val}$$

where $R_{val}$ and $I_{val}$ are sampled or determined values of the battery loss resistance and charging current, respectively.

Because the secondary battery is effectively charged with the substantially constant predetermined value ($V_{offval}$), the secondary battery is prevented from being overcharged with an overvoltage. In addition, the secondary battery is charged at the predetermined value ($V_{offval}$) even at the early stages. Consequently, the charging time is shortened.

BRIEF DESCRIPTION OF THE DRAWINGS

FIG. 4 is a chart showing respective values of an output voltage in respective ranges of a charging current in accordance with the first embodiment of the present invention.

DETAILED DESCRIPTION OF THE PREFERRED EMBODIMENTS

A first embodiment of the present invention is described with reference to Figs. 2–5. As will be explained in greater detail below, a charging apparatus in accordance with one embodiment of the present invention, charges a secondary battery with a controlled output voltage ($V_{out}$) of the charging apparatus, which maintains the effective charging voltage ($V_{off}$) at which the secondary battery is actually charged at a substantially constant predetermined value ($V_{offval}$). Consequently, overcharging of the secondary battery is substantially prevented and the charging time is substantially shortened.

Figure 2:
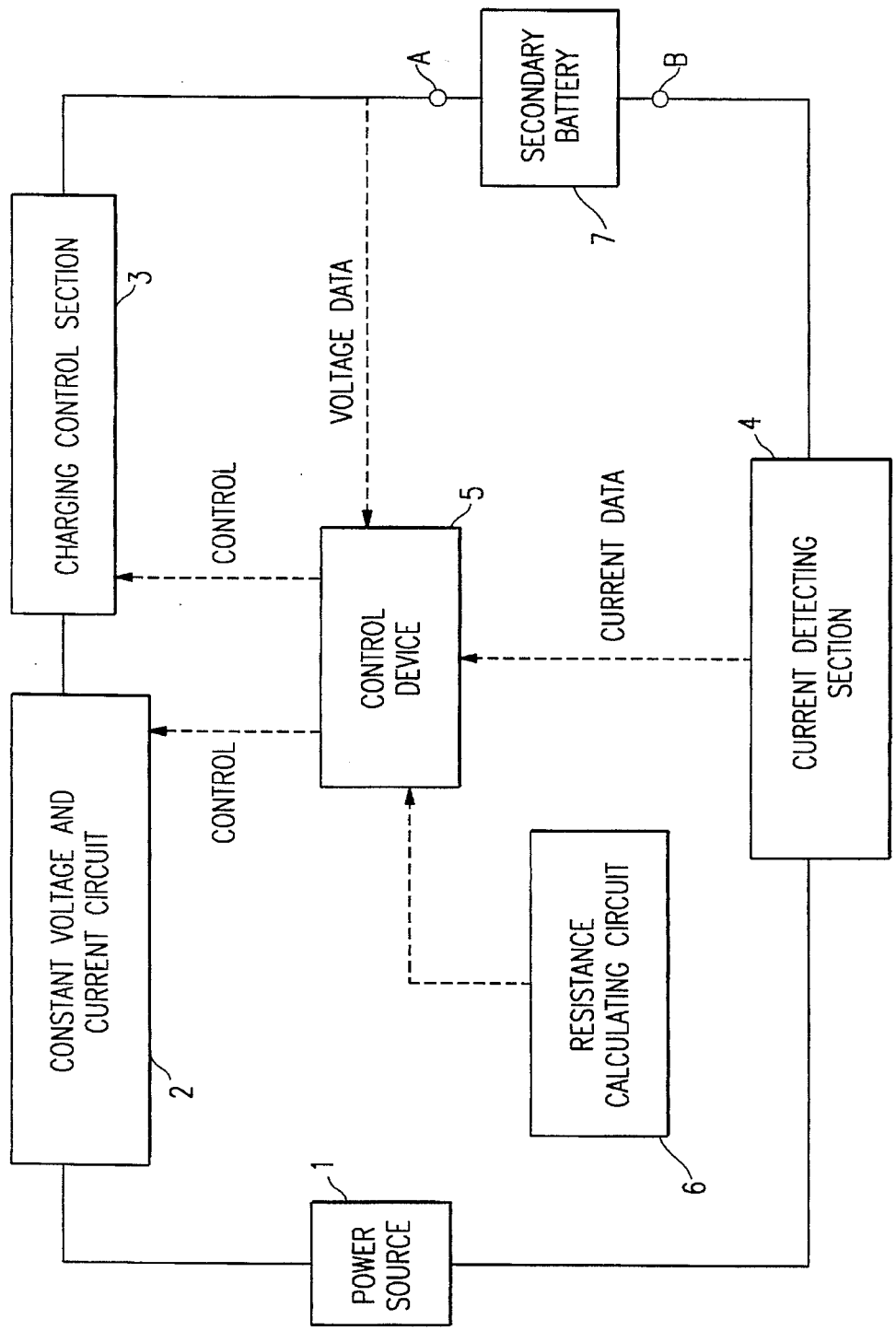
FIG. 2 is a block diagram of a charging apparatus in accordance with one embodiment of the present invention.

FIG. 2 shows a block diagram of a charging apparatus in accordance with one embodiment. In this embodiment, a lithium ion battery is used as the secondary battery. However, the present invention is applicable to other types of secondary batteries as well. The charging apparatus comprises a power source 1, a constant voltage and current circuit 2, a charging control section 3, a current detecting section 4 to detect the charging current and output data in response to the charging current, a control device 5, and a resistance calculating circuit 6. A secondary battery 7 is connected between output terminals A, B of the charging apparatus. The constant voltage and current circuit 2 converts the output power from the power source 1 to a constant voltage or a constant current, which is controlled by the control device 5. The charging control section 3 is connected between the constant voltage and current circuit 2 and the secondary battery 7. The control device 5 monitors the output voltage of the charging apparatus and the data from the current detecting section 4, and controls the charging control section 3 and the constant voltage and current circuit 2.

Figure 1:
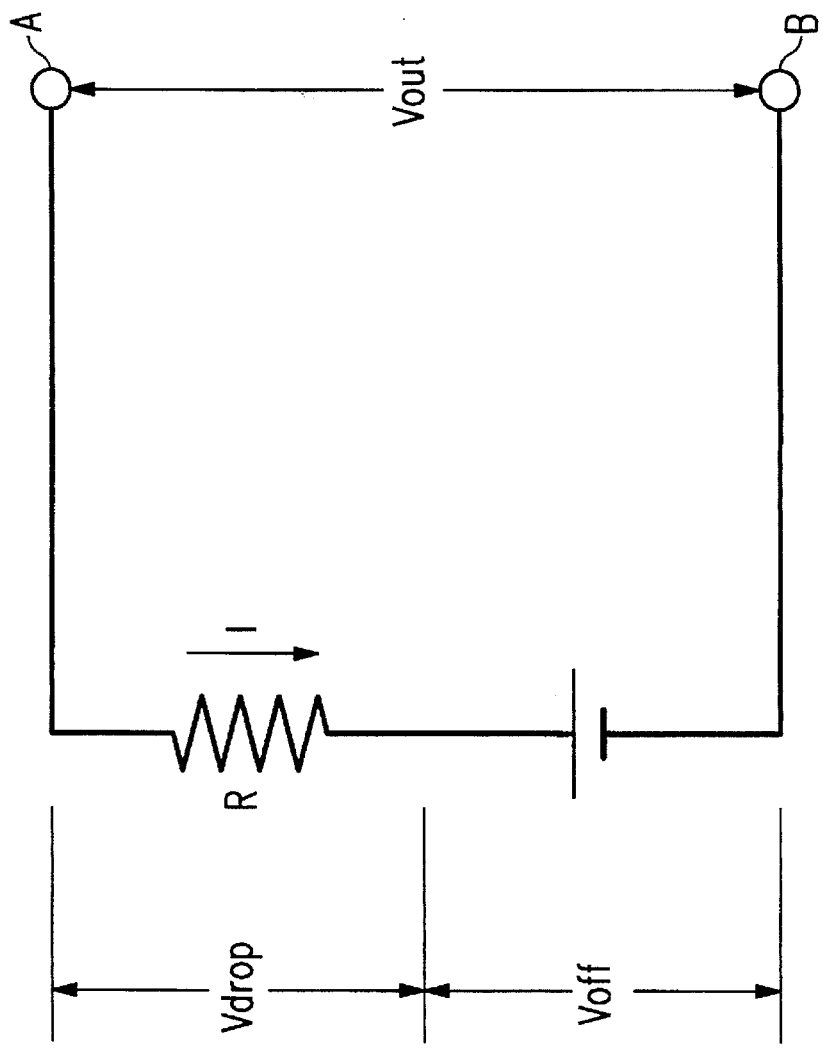
FIG. 1 is a equivalent circuit in which a secondary battery is set into a charging apparatus.

As explained in the above background of the invention, the equivalent circuit shown in FIG. 1 of a battery being charged includes a series loss resistance (R). Therefore as long as the charging current (I) flows, a voltage drop ($V_{drop}=R\times I$) is caused by the loss resistance (R). As a result, even though the charging apparatus outputs a constant output voltage ($V_{out}$), the secondary battery is actually charged with an effective voltage ($V_{off}=V_{out}-V_{drop}$).

The resistance calculating circuit 6 of FIG. 2 calculates a loss resistance valuebased on the following expression, $$R_{val}=(V_{outval}-V_{offval})/I_{val},$$

where $V_{outval}$ is a sampled value of the output voltage ($V_{out}$) and Ival is a sampled value of the charging current (I), $V_{offval}$ is a sampled value of the battery voltage ($V_{off}$) which is sampled while the charging is stopped.

The power source 1 converts the line alternating current (for example, AC current at 100 volts) to a direct current, and changes the direct current to a high frequency alternating current of a desired voltage. The high frequency alternating current is rectified into a smooth DC (direct current) voltage.

The charging control section 3 is connected between the constant voltage and current circuit 2 and the secondary battery 7, and stops the charging temporarily to sample the open circuit voltage ($V_{off}$). The charging control section 3 includes a switching element, such as, for example, an FET. The switching element is turned on or off in response to a signal from the control device 5.

The current detecting section 4 monitors the charging current, and converts analog data of the charging current into digital data, and sends the digital data to the control device 5. The current detecting section 4 comprises a current detecting resistance, an amplifier and an A/D converter (not shown). The current detecting resistance is connected in series with the secondary battery 7. The amplifier amplifies a voltage across both ends of the current detecting resistance. The A/D converter converts analog data from the amplifier into digital data. The digital data is sent to the control device 5.

The control device 5 is a microcomputer (CPU), and receives the digital data from the current detecting section 4. The control device 5 also receives analog data representing the output voltage of the charging apparatus which, in this embodiment, is also the terminal voltage applied to the secondary battery 7. An A/D converter (not shown) of the control device 5 converts the analog data of the output voltage into digital data.

The control device 5 controls the constant voltage and current circuit 2 in the following manner. At the beginning of charging, the secondary battery 7 is charged with a constant current. The terminal voltage of the secondary battery 7 may be monitored, and, when the terminal voltage of the secondary battery 7 becomes higher than predetermined voltage value, the secondary battery 7 is charged with constant voltage instead of the constant current. Alternatively, after an initial period of constant current charging, the battery can be charged with constant voltage. The above charging method enables the charging time to be short. The method of charging with constant voltage will be described below in detail.

Figure 3:
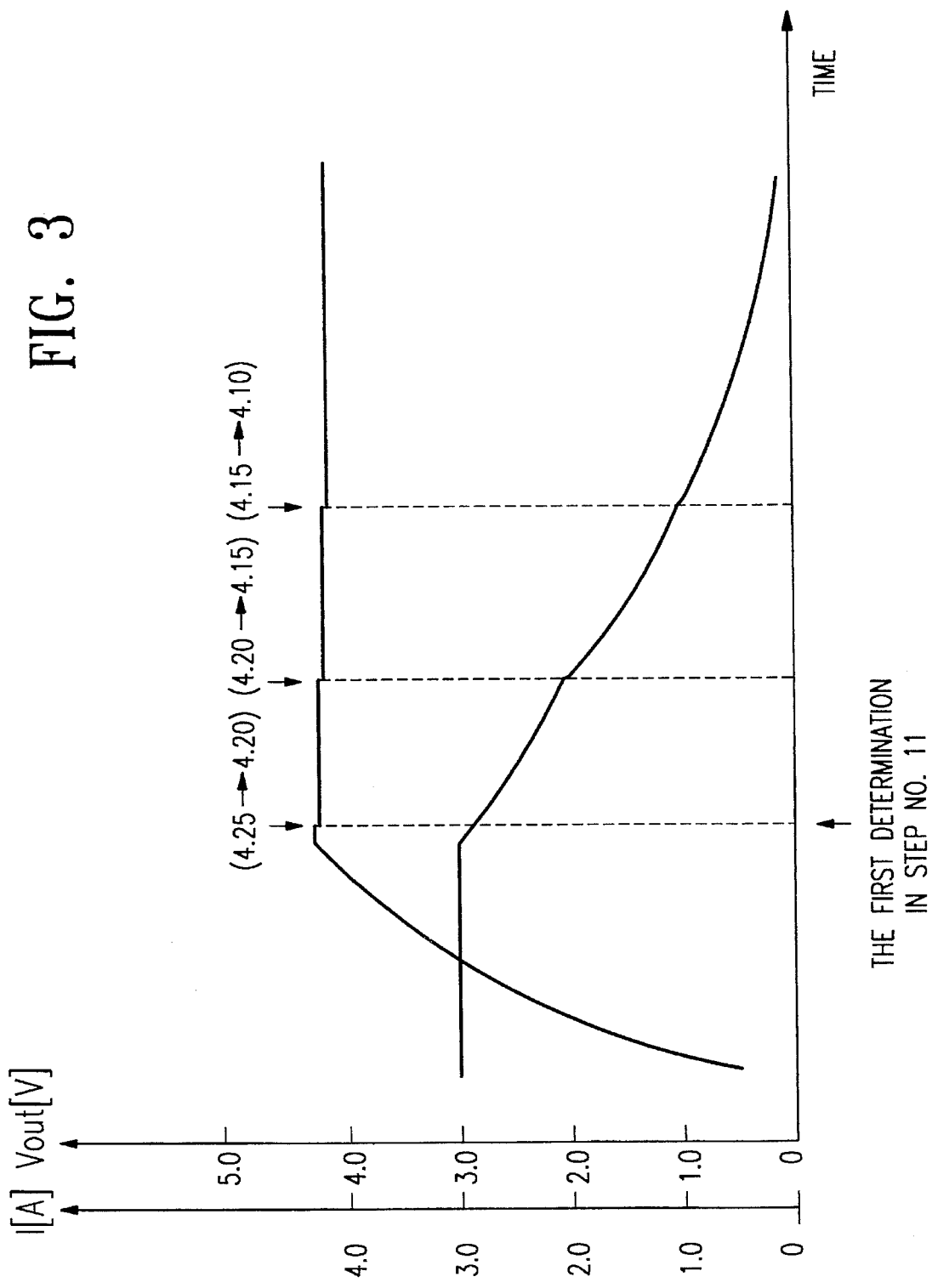
FIG. 3 is a graph showing charging characteristics in accordance with a first embodiment of the present invention.

In a preferred embodiment, the secondary battery comprises a nonaqueous, organic electrolyte, lithium secondary battery (hereinafter referred to a lithium ion secondary battery ). FIG. 3 shows the charging characteristics of the lithium ion secondary battery being charged in accordance with the illustrated embodiment of the present invention. During the initial charging period, the lithium ion secondary battery is charged with a predetermined constant current value (for example, 3.0A). During this period, the terminal voltage of the secondary battery may be monitored. When the terminal voltage becomes higher than a predetermined reference value (for example, 4.25 V), the lithium ion secondary battery is charged with a voltage instead of the constant current. During the voltage charging phase, the charging apparatus samples a value ($I_{val}$) of the charging current (I). Then the charging apparatus charges the secondary battery by controlling the output voltage ($V_{out}$) to maintain the effective charging voltage ($V_{off}$) at a substantially constant predetermined value ($V_{offval}$) according to the following expression (1).

$$V_{offval} = V_{out} - (R_{val} \times I_{val}) \quad (1)$$

where Rval is a calculated loss resistance value determined in the following manner.

In one embodiment, preferably during the phase in which the secondary battery 7 is charged with the constant current, the control device 5 turns off the switching element of the charging control section 3, so that the charging is substantially stopped. At that time, the control device 5 samples the open circuit voltage across terminals A and B. In this sampling, the charging current is substantially zero, therefore the voltage drop ($V_{drop}$) is substantially zero. As a result, the sampled open circuit voltage $V_{offval}$ substantially equals the actual voltage ($V_{off}$) of the battery being charged. The charging apparatus also samples a value (Ival) of the charging current (I) and a value ($V_{outval}$) of the output voltage value (Vout), while the secondary battery is being charged. Then, the loss resistance value ($R_{val}$) is calculated according to the following expression (2):

$$R_{val} = (V_{outval} - V_{offval})/I_{val} \quad (2)$$

The loss resistance value ($R_{val}$) is substantially constant all though the process.

As used herein, the term "stopping charging" is intended to include embodiments in which the charging current is completely shut off, as well as embodiments in which the charging current is reduced to a low level (for example, equal to or less than one tenth of a rated charging current). While the charging is stopped, the voltage ($V_{off}$) can be exactly sampled, substantially without a voltage drop caused by the charging current (I) flowing through the loss resistance (R).

In a first embodiment, as shown in FIG. 3, upon completion of the constant current charging phase, the charging apparatus outputs respective values of the output voltage ($V_{out}$) in a stepwise fashion, corresponding to respective ranges of the charging current (I) in the following manner.

The charging apparatus samples a value ($I_{val}$) of the charging current (I), and recognizes the respective range to which the sampled value ($I_{val}$) belongs. Then the charging apparatus charges the secondary battery, by setting the output voltage ($V_{out}$) to a value in accordance with the following expression (3), within the recognized respective range of the charging current (I), $$V_{out} = V_{offmax} + (R_{val} \times I_{min}) \quad (3)$$

where $I_{min}$ is a minimum current value in the recognized respective range, $V_{offmax}$ is a predetermined voltage value. The predetermined voltage value ($V_{offmax}$) is predetermined to prevent the secondary battery from being overcharged with a overvoltage. Therefore the secondary battery is charged at not more than the predetermined voltage value ($V_{offmax}$).

FIG. 4 is a chart showing the respective values of the output voltage ($V_{out}$) in the respective ranges of the charging current (I) in the first embodiment. For example, when the sampled value ($I_{val}$) of the charging current (I) is 2.5A, the charging apparatus recognizes that the sampled value ($I_{val}$=2.5A) falls in the range of 3.0A>I≧2.0A in which the minimum current value ($I_{min}$) of this range is selected to be 2.0A. Therefore, when the predetermined voltage value ($V_{offmax}$) is 4.10 V and the loss resistance value ($R_{val}$) is 50mΩ, the charging apparatus sets the output voltage ($V_{out}$)

to 4.20 V (=4.10 V+(50mΩ×2.0A)) according to the above expression (3). FIG. 4 also shows values of the voltage drop ($V_{drop}$) and permissible values of the actual battery voltage ($V_{off}$) corresponding to the respective ranges of the charging current (I). As shown in FIG. 4, the actual battery voltage ($V_{off}$) is controlled within a range of 4.05 to 4.10 which is sufficiently small to be regarded as a substantially constant value. Since the real voltage ($V_{off}$) is controlled to not exceed 4.10 V, the secondary battery will not be overcharged with an overvoltage.

In the first embodiment, when the sampled value ($V_{outval}$) is 4.25 V, the sampled value ($V_{offval}$) is 4.10 V, and the sampled value ($I_{val}$) is 3.0A, the loss resistance value ($R_{val}$) is calculated at 50mΩ(=(4.25 V−4.10 V)/3.0A ), according to the above expression (2).

On the other hand, in a second embodiment which will be explained below, the charging apparatus samples the charging current continuously and the charging apparatus changes the values of the output voltage ($V_{out}$) continuously, to supply a substantially constant effective voltage ($V_{off}$) to the battery continuously.

Figure 5:
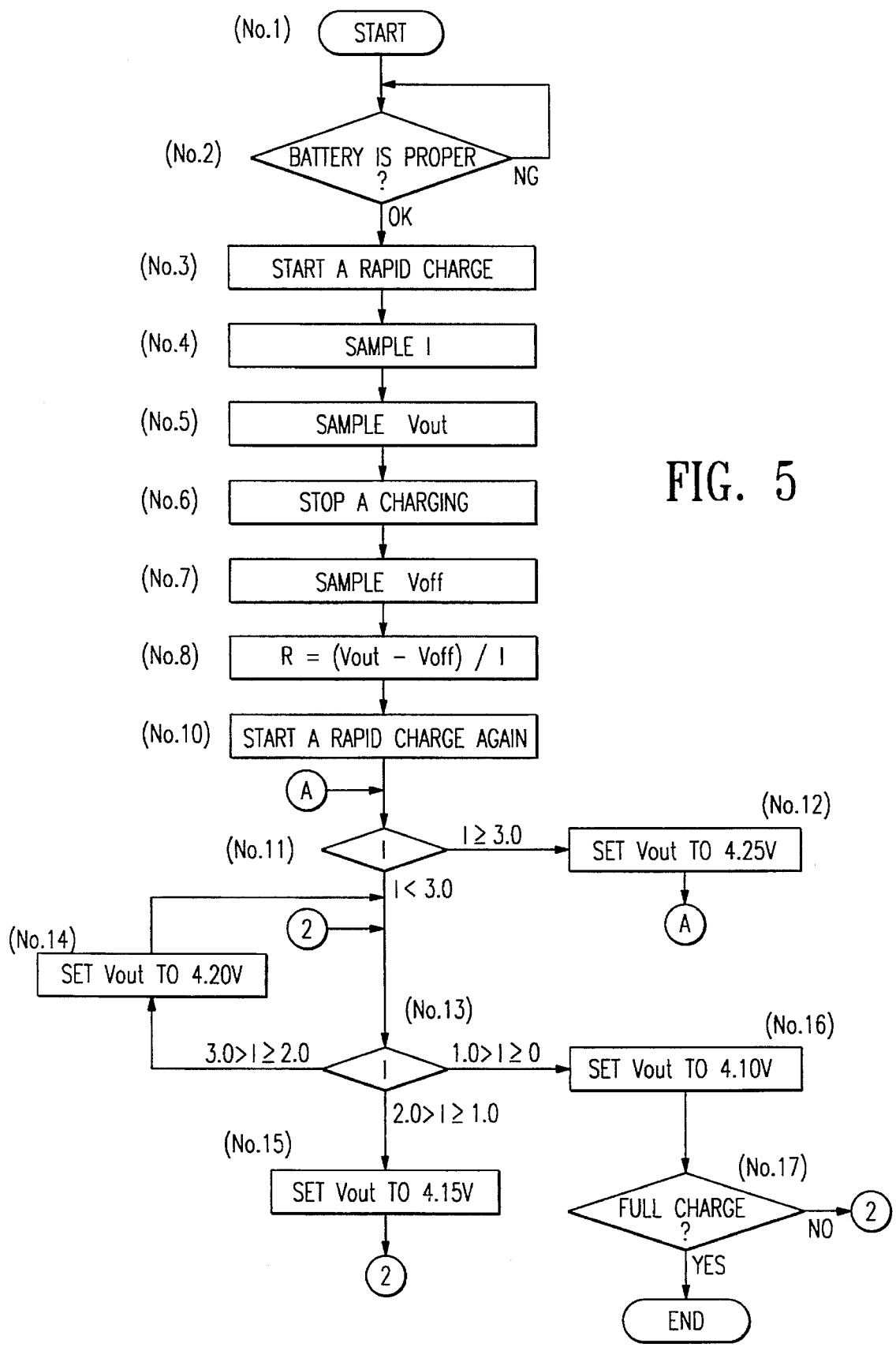
FIG. 5 is a flow chart showing a method of charging a secondary battery in accordance with the first embodiment of the present invention.

The charging method in accordance with the first embodiment will be described below with reference to a flow chart shown in FIG. 5. In step No. 1, the apparatus starts the process. A determination is made in step No. 2 as to whether the performance of the secondary battery 7 is proper. In step No. 2, the apparatus will stop the charging, for example, if an inner-shorted secondary battery has been set into the charging apparatus.

If the battery is OK, the apparatus starts a rapid charge in step No. 3. At the beginning of charging, the secondary battery 7 is charged with a predetermined constant current value (for example, 3.0A).

In step No. 4, while the secondary battery is charged, the charging current (I) is sampled. In step No. 5, while the secondary battery is charged, the output voltage (Vout) of the charging apparatus is sampled.

In step No. 6, the control device 5 stops the rapid charge, by turning off the switching element of the charging control section 3. The control device 5 samples in step No. 7 the terminal voltage of the secondary battery which as described above, is the actual battery voltage ($V_{off}$), since the voltage drop ($V_{drop}$) is absent.

The sampled value ($V_{outval}$) of the output voltage ($V_{out}$), the sampled value ($I_{val}$) of the charging current (I) and the sampled value ($V_{offval}$) of the real voltage ($V_{off}$) are inputted into the resistance calculating circuit 6. Then the resistance calculating circuit 6 calculates a value ($R_{val}$) of the loss resistance (R) from the inputted data, using the above expression (2).

For example, when the sampled value ($V_{outval}$) is 2.15 V, and the sampled value ($V_{offval}$) is 2.00 V, and the sampled value ($I_{val}$) is 3.0A, the value ($R_{val}$) of the loss resistance (R) is calculated at 50mΩ(=(2.15 V−2.00 V )/3.0A).

The control device 5 restarts the rapid charge in step 10, by turning on the switching element of the charging controlling section 3, and the terminal voltage of the secondary battery 7 is monitored. When the terminal voltage becomes higher than a predetermined voltage (for example, 4.25 V), the secondary battery 7 is charged by a constant voltage (for example, 4.25 V) instead of the constant current. The control device 5 samples the charging current I. Then in step No. 11, a determination is made as to whether the sampled charging current (I) is equal to or more than 3.0A.

When the charging current (I) is equal to or more than 3.0A, the process proceeds to step No. 12 where the control device 5 sets the output voltage ($V_{out}$) to 4.25 V. As explained above in connection with FIGS. 3 and 4, when the charging current (I) is equal to or more than 3.0A, the charging apparatus recognizes that the charging current (I) belongs to the range of I≧3.0A, and the minimum current value ($I_{min}$) in the range of I≧3.0A is determined to be 3.0A. Therefore, according to the above-mentioned expression (3), the charging apparatus sets the output voltage ($V_{out}$) to 4.25 V (=4.10 V+(50mΩ)×3.0A)). Then the process goes back to step No. 11.

When the charging current (I) is less than 3.0A, the process proceeds to step No. 13. As shown in FIG. 3, at the first determination in step No. 11, since the charging current (I) is less than 3.0A, the process proceeds to step No. 13. The control device 5 samples the charging current (I) in step No. 13, and a determination is made as to whether the charging current I is less than 3.0A but not less than 2.0A or whether it is less than 2.0A but not less than 1.0A or whether it less than 1.0A but not less than 3.0A.

When the charging current (I) is less than 3.0A but not less 2.0A, the control device 5 sets the charging voltage ($V_{out}$) to 4.20 V in step No. 14. As explained above in connection with FIGS. 3 and 4, when the charging current (I) is 3.0A>I≧2.0A, the charging apparatus recognizes that the charging current (I) belongs to the range of 3.0A>I≧2.0A, and the minimum current value (Imin) in this range is determined to be 2.0A. Therefore, according to the above-mentioned expression (3), the charging apparatus sets the output voltage (Vout) to 4.20 V (=4.10 V+(50mΩ×2.0A)). Then, as long as the charging current (I) is in the range of 3.0A>I≧2.0A, the process repeats between steps No. 13 and No. 14, while the secondary battery is charged.

When the charging current (I) is less than 2.0A but not less than 1.0A, the process proceeds to step No. 15 where the control device 5 sets the output voltage ($V_{out}$) to 4.15 V. As explained above in connection with FIGS. 3 and 4, when the charging current (I) is 2.0A>I≧1.0A, the charging apparatus recognizes that the charging current (I) to belongs to the range of 2.0A>I≧1.0A, and the minimum current value ($I_{min}$) in this range is determined to be 1.0A. Therefore, according to the above-mentioned expression (3), the charging apparatus sets the output voltage ($V_{out}$) to 4.15 V(=4.10 V+(50mΩ×1.0A)). Then the process goes back to step No. 13.

When the charging current (I) is less than 1.0A and not less than 0.0A, the process proceeds to step No. 16 where the control device 5 sets the output voltage ($V_{out}$) to 4.10 V. As explained above in connection with FIGS. 3 and 4, when the charging current (I) is 1.0A>I≧0A, the charging apparatus recognizes that the charging current (I) belongs to the range of 1.0A>I≧0A, and the minimum current value ($I_{min}$) in this range is determined to be 0A. Therefore, according to the above-mentioned expression (3), the charging apparatus sets the output voltage ($V_{out}$) to 4.10 V(=4.10 V+(50mΩ×0A)).

Thereafter, the secondary battery 7 is charged with the output voltage (4.10 V) until a fully charged state in step No. 17.

As mentioned above, in the first embodiment, the apparatus changes the values of the output voltage ($V_{out}$) in a stepwise fashion, to supply the substantially constant effective charging voltage ($V_{off}$) continuously to the battery 7. Since the effective voltage ($V_{off}$) is controlled to be not more than 4.10 V, the secondary battery will not be overcharged with an overvoltage. It is recognized of course that other values may be set for the values set forth in FIG. 4, depending upon the particular application.

Figure 6:
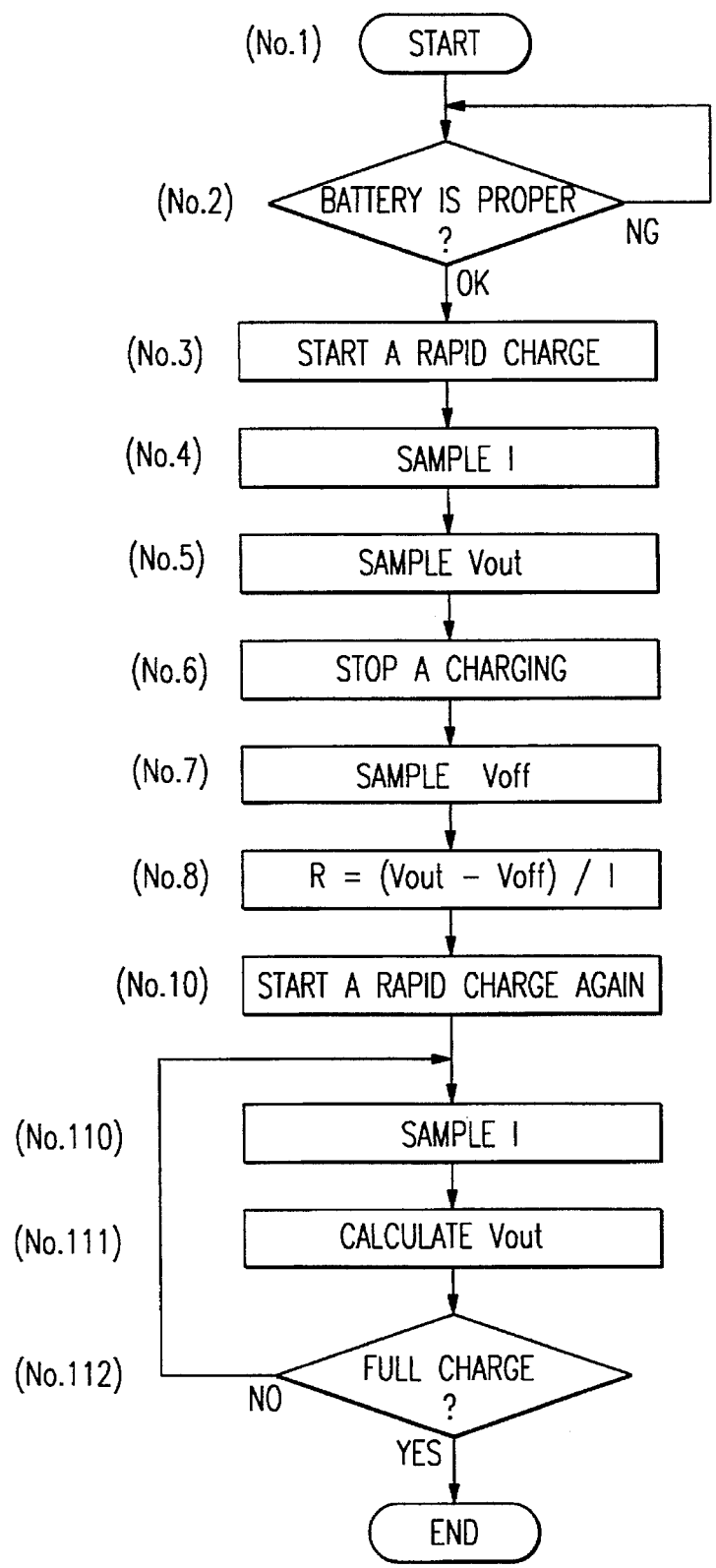
FIG. 6 is a flow chart showing a method of charging a secondary battery in accordance with a second embodiment of the present invention.

On the other hand, in the second embodiment which will be explained below with reference to the flow chart shown in FIG. 6, while the charging apparatus continuously samples the charging current (I), the charging apparatus continuously changes the values of the output voltage ($V_{out}$) to supply a substantially constant effective voltage ($V_{off}$) continuously to the battery 7.

The process of the second embodiment progresses in the same way as the first embodiment until step No. 10. The following process will be discussed below in detail.

The control device 5 samples the charging current (I) in step No. 110. Then, based on the sampled value ($I_{val}$) of the charging current (I) obtained in step No. 110 and the calculated value ($R_{val}$) of the loss resistance (R) obtained in step No. 8, the control device 5 calculates a value ($V_{outval}$) of the output voltage ($V_{out}$) according to the following expression as explained in the above expression (1) in step No. 111.

$$V_{outval} = V_{off}(=4.10\ V) + V_{drop}(=R_{val} \times I_{val})$$

where the effective charging voltage ($V_{off}$) is set to 4.10 V which is a predetermined constant desirable voltage to charge the lithium ion secondary battery 7. For example, if the sampled value ($I_{val}$) of the charging current (I) obtained in step No. 110 is 2.6A, and the calculated value ($R_{val}$) of the loss resistance (R) obtained in step No. 8 is 50mΩ, the value ($V_{outval}$) of the output voltage ($V_{out}$) is calculated at 4.23 V. Then, the control device 5 controls the output voltage ($V_{out}$) at 4.23 V, so that the secondary battery 7 is actually charged with the constant voltage (4.10 V) as the voltage ($V_{off}$).

Thereafter, a determination is made in step No. 112 as to whether the secondary battery 7 is fully charged. If the secondary battery 7 is not fully charged, the process goes back to step No. 110. In other words, the charging is continued until the fully charged state, while the control device 5 continuously changes the values of the output voltage ($V_{out}$) to maintain the effective charging of secondary battery 7 at the constant $V_{off}$ voltage (4.10 V).

When the secondary battery 7 is fully charged, the charging is completed.

It will, of course, be understood that modifications of the present invention, in its various aspects will be apparent to those skilled in the art, some being apparent only after study and others being matters of routine electronic design. As such, the scope of the invention should not be limited by the particular embodiment herein described but should be defined only by the appended claims and equivalent thereof.

What is claimed:

1. A method of charging a secondary battery, the method comprising the steps of:

charging the secondary battery with an output voltage ($V_{out}$) and a charging current (I), the secondary battery having a loss resistance value ($R_{val}$) so that the battery is actually charged with an effective voltage ($V_{off}$) described by the following expression:

$$V_{off} = V_{out} - (R_{val} \times I);$$

sampling a value ($I_{val}$) of the charging current (I); and controlling the output voltage ($V_{out}$) to keep the effective voltage ($V_{off}$) at a substantially constant predetermined value ($V_{offval}$) according to the following expression:

$$(V_{offval}) = V_{out} - (R_{val} \times I_{val}).$$

2. A method according to claim 1, further comprising the steps of:

during charging of the secondary battery, sampling a value ($I_{val2}$) of the charging current (I) and a value ($V_{outval}$) of the output voltage ($V_{out}$);

substantially stopping charging, and sampling a value ($V_{offval2}$) of the effective voltage ($V_{off}$) of the secondary battery; and calculating the loss resistance value ($R_{val}$) according to the following expression:

$$R_{val} = (V_{outval} - V_{offval2})/I_{val2}.$$

3. A method according to claim 1, further comprising the step of repeating the steps in claim 1, until the secondary battery is charged at a fully charged state.

4. A method according to claim 1, further comprising the step of charging the second battery with a constant current, before the step in claim 1 of sampling the value ($I_{val}$) of the charging current (I).

5. A method of charging a secondary battery, the method comprising the steps of:

generating an output voltage ($V_{out}$) and a charging current (I) for the secondary battery which has a loss resistance value ($R_{val}$) so that it is actually charged with an effective voltage ($V_{off}$) described by the following expression:

$$V_{off} = V_{out} - (R_{val} \times I);$$

sampling a value ($I_{val}$) of the charging current (I); and charging the secondary battery by setting the output voltage ($V_{out}$) to a value of the following expression:

$$V_{out} = V_{offval} + (R_{val} \times I_{val}),$$

where $V_{offval}$ is a value of a substantially constant predetermined value.

6. A method according to claim 5, further comprising the steps of:

during charging of the secondary battery, sampling a value ($I_{val2}$) of the charging current (I) and a value ($V_{outval}$) of the output voltage value ($V_{out}$);

substantially stopping charging, and sampling a value ($V_{offval2}$) of the effective voltage ($V_{off}$) of the secondary battery; and calculating the loss resistance value ($R_{val}$) according to the following expression:

$$R_{val} = (V_{outval} - V_{offval2})/I_{val2}.$$

7. A method according to claim 5, further comprising the step of repeating the steps in claim 5, until the secondary battery is charged at a fully charged state.

8. A method according to claim 5, further comprising the step of charging the secondary battery with a constant current, before the step in claim 5 of sampling the value ($I_{val}$) of the charging current (I).

9. A method of charging a secondary battery, the method comprising the steps of:

charging the battery with an output voltage ($V_{out}$) and a charging current (I), the secondary battery having a loss resistance value ($R_{val}$) so that it is actually charged with an effective voltage ($V_{off}$) described by the following expression:

$$V_{off} = V_{out} - (R_{val} \times I);$$

sampling a value ($I_{val}$) of the charging current (I);

comparing the value ($I_{val}$) to a plurality of ranges, each range being defined by a maximum and minimum current value and identifying the range which includes the sampled value ($I_{val}$);

charging the secondary battery by setting the output voltage ($V_{out}$) to a value of the following expression, within the identified respective range of the charging current (I); and $$V_{out} = V_{offmax} + (R_{val} \times I_{min}),$$

where $I_{min}$ is the minimum current value of the identified respective range and $V_{offmax}$ is a predetermined voltage value.

10. A method according to claim 9, further comprising the steps of:

during charging of the secondary battery, sampling a value ($I_{val2}$) of the charging current (I) and a value ($V_{outval}$) of the output voltage value ($V_{out}$);

substantially stopping charging, and sampling a value ($V_{offval}$) of the effective voltage value ($V_{off}$) of the secondary battery; and calculating the loss resistance value ($R_{val}$) according to the following expression:

$$R_{val} = (V_{outval} - V_{offval})/I_{val2}.$$

11. A method according to claim 9, further comprising the step of repeating the steps in claim 9, until the secondary battery is charged at a fully charged state.

12. A method according to claim 9, further comprising the step of charging the secondary battery with a constant current, before the step in claim 9 of sampling the value ($I_{val}$) of the charging current (I).

13. A method of charging a battery having a loss resistance, the method comprising the steps of:

applying an output voltage to the battery to produce a charging current through the battery which causes a voltage drop across the loss resistance so that the battery is effectively charged at a voltage defined by the difference between the output voltage and the voltage drop; and controlling the output voltage so that the difference between the output voltage and the voltage drop remains substantially constant.

\* \* \* \* \*